Dec. 29, 1936.  G. K. BLUM  2,065,638
BUCKLE DEVICE
Filed June 6, 1935

INVENTOR
Gustave K. Blum,
By Archworth Martin,
Attorney.

Patented Dec. 29, 1936

2,065,638

UNITED STATES PATENT OFFICE 2,065,638

BUCKLE DEVICE

Gustave K. Blum, York, Pa., assignor to The McKay Company, Pittsburgh, Pa., a corporation of Pennsylvania Application June 6, 1935, Serial No. 25,255

7 Claims. (Cl. 24—73)

My invention is hereinafter described as employed more particularly as a buckle-like fastening device for retaining anti-skid chains in place upon vehicle wheels, but it will be understood that various features of the invention are susceptible of use in other ways.

One object of my invention is to provide a buckle device which while it may be made of a single piece of material is nevertheless effective in holding a strap against slipping.

Another object of my invention is to provide a buckle device wherein no moving parts are required for retaining a strap against slipping or loosening.

Figure 1:
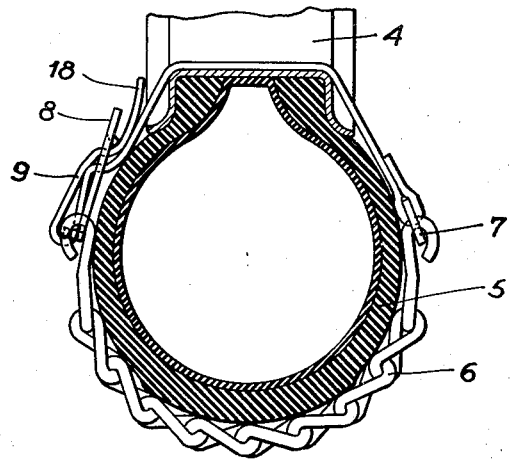
Figure 2:
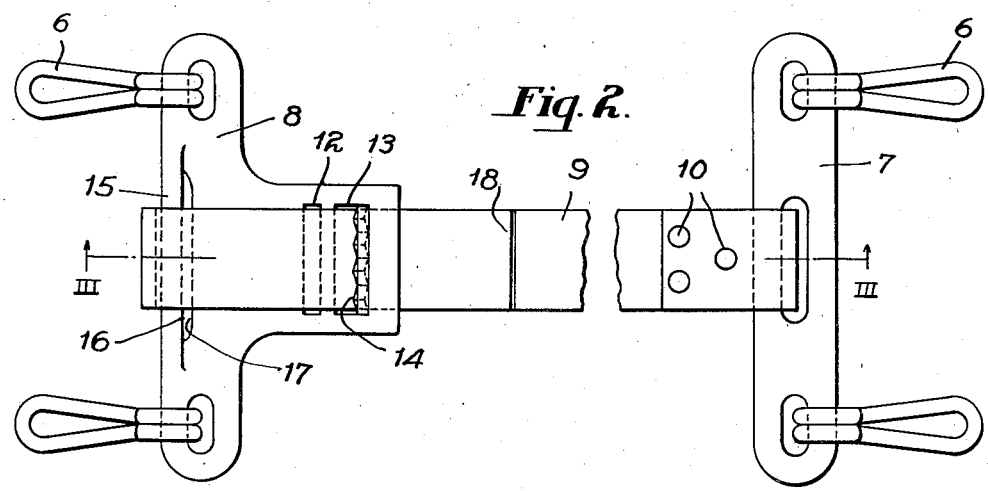
Figure 3:
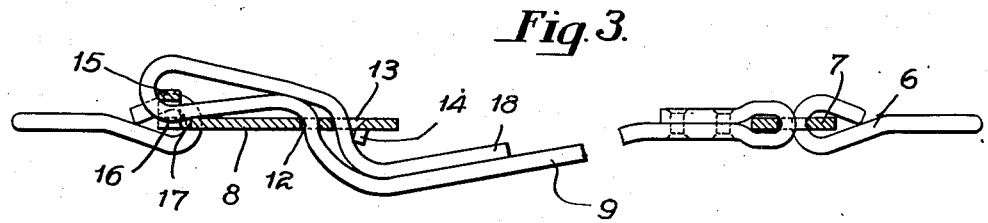

As shown in the accompanying drawing, Figure 1 is a cross-sectional view of a portion of a vehicle wheel, showing an anti-skid chain held in place by my fastening device; Fig. 2 is a fragmentary plan view of certain of the parts of Fig. 1, and Fig. 3 is a view taken on the line III—III of Fig. 2.

A portion of a wheel rim 4 is shown that carries a tire 5 in the usual manner. Anti-skid cross chains 6 are disposed across the tread of the tire and these chains may be of any suitable form. Opposite ends of the chains are connected to a bar 7 and a buckle plate 8, respectively. It will be understood, of course, that the chains 6 need not be arranged in pairs, but that a single cross chain could be connected to bars corresponding to the members 7 and 8, or that any number of cross chains could be so connected.

The chains are intended to function in the manner of any various known types of anti-skid chains, including those wherein a complete series of cross chains are connected at their ends to side chains that are disposed against the sides of the tire or the wheel rim. The present invention is shown as employed in connection with what is sometimes termed unit chains that consist of one or more cross chains, each one or each group of which is individually secured to the vehicle wheel, independently of the others, by separate fastening means, instead of all of the cross chains being connected to the usual annular side chains.

The strap 9 is looped at one end through the bar 7 and has the looped end fastened by rivets 10, or other suitable fastening means. The cross chains 6 at one end have the usual hooked connection with the bar 7, and at their other ends have connection with the buckle plate 8.

The buckle plate 8 may be formed of a single sheet of metal by stamping and punching operations or by casting. Slots 12 and 13 are formed in the plate near one end thereof, the metal along one side of the slot 13 being struck down to form a lip 14 which may be serrated, if desired, as shown in Figs. 2 and 3. At the point near the other end of the plate, it is slitted, and a bar portion 15 of the metal deflected to form a slot 16. By cutting away the metal or otherwise relieving the one wall of the slot as indicated at 17, ample clearance space is provided between the deflection portion 15 and said relief end 17 to permit convenient insertion of the strap, without the necessity of deflecting the portion 15 too far outwardly from the plane of the plate 8.

In applying the structure to a wheel, the cross chains 6 are placed against the tread of the wheel and the strap passed over the felly or rim 4. Thereupon, the strap 9 is inserted through the slot 12, preferably in a direction perpendicular to the plane of the plate, so that the strap can be conveniently drawn taut. The free end 18 of the strap is then passed through the slot 16 and folded back so that it can be passed through the slot 13 to the position shown in Fig. 3.

While the slot 12 could be made wide enough to receive two thicknesses of the strap, and the slot 13, eliminated, I find it desirable to place the folded back end 18 of the strap through the separate slot 13, as this can be done without disturbing the position of the strap in the slot 12, and furthermore, the buckle plate can be tilted slightly in a direction away from the tire, to permit convenient insertion of the end 18 through the slot 13. Tension on the strap tilts the plate toward the tire, thereby increasing the binding action on the strap and its end 18. The sinuous contour given to the strap by the arrangement of the slots 12 and 16 and the loop around the bar 15 will, when the strap is bent back upon itself and its free end passed through the slot 13, be very effective to hold the strap against slipping in the buckle plate against tensional stresses, even though no biting edge is provided as at 14, the inherent stiffness of the strap preventing creeping thereof relative to the plate.

An important feature of my invention resides in the fact that the member 8 which is connected by the strap 9 to the bar 7 has the buckle device formed unitarily or integrally therewith, thereby making it unnecessary to provide a separately-formed buckle in addition to the bars 7 and 8. Moving parts are likewise eliminated with consequent freedom from wear and failure thereof.

Also, the various slots are preferably only of sufficient width to receive the straps easily, but snugly, whereby the strap will bind against opposite corners of the slots when bent or deflected into sinuous contour.

I claim as my invention:—

1. The combination with two members to be connected, of a strap secured to one of said members, the other member serving also as a buckle plate and provided with a slot adjacent to each end thereof and an intermediate slot, all arranged to permit the free end of the strap to be passed outwardly through the intermediate slot, thence through the slot which is remote from the said one member and, when bent back upon itself, to be passed inwardly through the third slot, in position to overlie the body portion of the strap.

2. The combination with two members to be connected, of a strap secured to one of said members, the other member serving also as a buckle plate and provided with a slot adjacent to each end thereof and an intermediate slot, all arranged to permit the free end of the strap to be passed outwardly through the intermediate slot, thence through the slot which is remote from the said one member and, when bent back upon itself, to be passed inwardly through the third slot, in position to overlie the body portion of the strap, the said remote slot being formed between the body of the plate and an outstandingly deflected end portion thereof.

3. The combination with two members to be connected, of a strap secured to one of said members, the other member serving also as a buckle plate and provided with a slot adjacent to each end thereof and an intermediate slot, all arranged to permit the free end of the strap to be passed outwardly through the intermediate slot, thence through the slot which is remote from the said one member and, when bent back upon itself, to be passed inwardly through the third slot, in position to overlie the body portion of the strap, the inner surface of the plate having a spur-like projection against which the said overlying portion of the strap can be held by the body portion thereof.

4. The combination with two members to be connected, of a strap secured to one of said members, the other member serving also as a buckle plate and provided with a slot adjacent to each end thereof and an intermediate slot, all arranged to permit the free end of the strap to be passed outwardly through the intermediate slot, thence through the slot which is remote from the said one member and, when bent back upon itself, to be passed inwardly through the third slot, in position to overlie the body portion of the strap, the said remote slot being formed by an outstanding bar-like portion at the adjacent extremity of the plate.

5. The combination with two members to be connected, of a strap secured to one of said members, the other member serving also as a buckle and provided with a slot adjacent to each end thereof and with an intermediate slot adjacent to that end which is nearest to the said one member, the slot at the remote end having its outermost wall outstanding from the plane of the buckle, all of such slots being so arranged as to permit insertion of the strap therethrough by passing it first outwardly through the intermediate slot and thence through said remote slot, and then, when bent back upon itself to be passed inwardly through the third slot.

6. The combination with two members to be connected, of a strap secured to one of said members, the other member serving also as a buckle plate and provided with a slot adjacent to each end thereof and an intermediate slot, all arranged to permit the free end of the strap to be passed outwardly through the intermediate slot, thence through the slot which is remote from the said one member and, when bent back upon itself, to be passed inwardly through the third slot, in position to overlie the body portion of the strap, the width of said intermediate slot being substantially equal to the thickness of the strap.

7. The combination with two members to be connected, of a strap secured to one of said members, the other member serving also as a buckle and provided with a slot adjacent to each end thereof and with an intermediate slot adjacent to that end which is nearest to the said one member, the slot at the remote end having its outermost wall outstanding from the plane of the buckle, all of such slots being so arranged as to permit looping of the strap around said outstanding portion and the adjacent portions thereof to be passed through the two slots adjacent to said nearest end.

GUSTAVE K. BLUM.